United States Patent [19]

Veldhuis

[11] Patent Number: 4,839,843
[45] Date of Patent: Jun. 13, 1989

[54] METHOD AND APPARATUS FOR CORRECTING A SEQUENCE OF INVALID SAMPLES OF AN EQUIDISTANTLY SAMPLED SIGNAL

[75] Inventor: Raymond N. J. Veldhuis, Eindhoven, Netherlands

[73] Assignee: U.S. Philips Corporation, New York, N.Y.

[21] Appl. No.: 898,464

[22] Filed: Aug. 20, 1986

[30] Foreign Application Priority Data

Apr. 14, 1986 [NL] Netherlands ................... 8600932

[51] Int. Cl.$^4$ .................. G06F 7/38; G06F 15/336
[52] U.S. Cl. ................... 364/724.11; 364/724.10; 364/728.03
[58] Field of Search ................ 364/723, 724, 728; 371/31

[56] References Cited

PUBLICATIONS

Kailath et al., "An Innovations Approach to Least-Squares Estimation-Part V: Innovations Representations and Recursive Estimation in Colored Noise", *IEEE Trans. on Automatic Control*, vol. AC-18, No. 5, Oct. 1973, pp. 435–453.

Aasnaes et al., "An Innovations Approach to Least-Squares Estimation-Part VII: Some Applications of Vector Autoregressive Moving Average Models", *IEEE Trans. on Automatic Control*, vol. AC-18, No. 6, Dec. 1973, pp. 601–607.

Gevers et al., "An Innovations Approach to Least-Squares Estimation-Part VI: Discrete-Time Innovations Representations and Recursive Estimation", *IEEE Trans. on Automatic Control*, vol. AC-18, No. 6, Dec. 1973, pp. 588–600.

Toyoda et al., "An Application of State Estimation to Short-Term Load Forecasting, Part I: Forecasting Modeling"; *IEEE Trans. on Power Apparatus and Systems*, vol. PAS-89, No. 7, Sep./Oct. 1970, pp. 1678–1682.

Tretter, "Linear Parameter Estimation", pp. 355–369.

*Primary Examiner*—Gary V. Harkcom
*Assistant Examiner*—Long T. Nguyen
*Attorney, Agent, or Firm*—David R. Treacy

[57] ABSTRACT

Method and apparatus for replacing a sequence of invalid samples of an equidistantly sampled signal, such as an audio signal, with valid signal samples from a remote preceding environment of valid samples which, but for a scaling factor, approximates as closely as possible the environment preceding the set of invalid samples to be replaced. Although a sequence of valid samples subsequent to the set of invalid samples is necessary to define the environment of the invalid set, the subsequent sequence can be relatively short. Consequently, the time delay required for replacing invalid samples is much shorter than with methods based on valid samples in an environment subsequent to the invalid samples.

5 Claims, 2 Drawing Sheets

METHOD AND APPARATUS FOR CORRECTING A SEQUENCE OF INVALID SAMPLES OF AN EQUIDISTANTLY SAMPLED SIGNAL

BACKGROUND OF THE INVENTION

1. Field of the Invention

The invention relates to a method of and apparatus for correcting a sequence of samples which are considered as invalid, of an equidistantly sampled signal, on the basis of replacement values derived from sequences of valid samples.

2. Description of the Related Art

Such a method and apparatus are described in applicant's copending U.S. application Ser. No. 898,460 (PHN 11,716) filed concurrently herewith, which claims priority based on a Netherlands patent application. Such U.S. application also references a pending application, assigned to the present assignee, filed Mar. 30, 1988 as a continuation of U.S. application Ser. No. 601,817, filed Apr. 19, 1984, now abandoned, disclosing a different kind of restoration technique for invalid signal samples.

The restoration technique described in such concurrently filed U.S. application requires the availability, immediately after a sequence of samples to be restored, of a relatively long subsequent sequence of valid samples. More specifically, the length of such a subsequent sequence must correspond to a maximum anticipated instantaneous periodicity of a signal segment of which the sequence of samples to be restored forms part. For example, for speech sampled at a rate of 8000 Hz such a subsequent sequence must comprise approximately 160 samples. Consequently, a delay of 20 msec is introduced after the appearance of the sequence of samples to be restored before the result of the restoration procedure can be made available.

In addition, the implementation of the above-described restoration technique requires that the periodicity of a signal segment containing the sequence of samples to be restored must be estimated. The replacement values for restoring invalid samples are then determined by solving a system of equations in which the replacement values are unknown factors.

SUMMARY OF THE INVENTION

The invention has for its object to provide an alternative restoration technique, in which the delay introduced by the necessity of a subsequent sequence of valid samples, as described above, is reduced.

To that end, a method according to the invention is characterized in that an environment of the relevant sequence of samples to be restored is compared with an environment of an equally long sequence of valid samples which occurred a predetermined period of time earlier;

such a comparison is made for a plurality of different predetermined periods of time;

the environment which most closely approximates the sequence of samples to be restored is selected; and the valid samples boundd by the environment thus selected are used for forming the replacement values.

More specifically, a method of restoring a sequence of m samples $s_{t+i}$, wherein $i=0, \ldots, m-1$ which are considered invalid, is characterized in accordance with the invention by the following steps:

(a) values of valid samples immediately preceding the first invalid sample $s_t$, in combination with values of valid samples in a immediately subsequent environment following the last invalid sample $s_{t+m-1}$ and containing a number of p samples, are correlated with values of a number of samples preferably equal to p which are present in an environment immediately preceding a sample $s_q$, wherein q represents a variable sample position in the range $p \leq q \leq t-p$, in combination with values of samples present in an environment immediately subsequent to the sample $s_{q+m-1}$;

(b) the correlation result of step (a) is determined and recorded;

(c) the steps (a) and (b) are repeated in that sequence for a plurality of differently chosen q-values;

(d) from the set of correlation results determined after step (c) the correlation result having the lowest value is determined;

(e) the value q corresponding to the correlation result obtained in step (d) is determined, more specifically $q_{opt}$; and (f) a sequence of values of the samples in the positions $q_{opt}, \ldots, q_{opt+m-1}$ is selected, the replacement values for the samples $s_t, \ldots, s_{t+m-1}$ being formed from the values of the samples thus selected.

A preferred embodiment of a method according to the invention, in which the correlation procedure is normalised, is characterized in that each environment determined by a value q opted for is scaled by a factor $a_q$ so that the mean square error relative to the environment of the samples to be restored is minimal and each of the values of the samples in the indicated positions $q_{opt}, \ldots, q_{opt+m-1}$ is multiplied by the factor $a_{q_{opt}}$.

It is illustrative of the invention that in the case of speech which is sampled at a rate of 8000 Hz, the time interval corresponding to said subsequent sequence can be reduced to approximately 25 samples, i.e. to approximately 3 msec.

Apparatus for performing the method according to the invention is characterized by comparator means for comparing values of samples which constitute an environment for the relevant sequence of samples to be restored, the values constituting a test environment of the relevant sequence of samples to be restored, which values or samples constitute a test environment of an equally large sequence of valid samples which appeared a predetermined period of time earlier;

indicating means for indicating several groups of samples shifted in time relative to each other, each group forming one of said test environments;

control means controlling the mode of operation of said comparator means in dependence on the indication result of the indicator means;

selection means which on the basis of the results provided by the comparator means select that test environment which approximates the environment of the sequence of samples to be restored most closely; and arithmetic means deriving the replacement values from the values of the samples which are bounded by the selected test environment.

More specifically, an apparatus for performing the method according to the invention, is characterized by an arithmetic unit arranged for always calculating for a plurality of chosen values q, wherein $q=p, \ldots, t-p$, the quantities $a_q$ and $\epsilon(q, a_q)$ in accordance with the formulae $$a_q = \frac{\sum_{i=0}^{p-1}(s_{t-p+i} \cdot s_{q-p+i} \cdot s_{t+m+i} \cdot s_{q+m+i})}{\sum_{i=0}^{p-1}(s_{q-p+i}^2 + s_{q+m+i}^2)}, q = p, \ldots t-p$$

and $$\epsilon(q, a_q) = \sum_{i=0}^{p-1}(s_{t-p+i}^2 + s_{t+m+i}^2) - a_q^2 \sum_{i=0}^{p-1}(s_{q-p+i}^2 + s_{q+m+i}^2);$$

A comparator unit selects from the pairs of quantities $a_q$ and $\epsilon(q, a_q)$, as generated by the arithmetic unit, that pair for which $\epsilon(q, a_q)$ is minimal and determines the associated values for q and $a_q > 0$ as $q_{opt}$ and $a_{opt}$; and a multiplying circuit multiplies each of the sample values in the position $q_{opt+i}$, wherein $i=0, \ldots, m-1$, by $a_{opt}$ and substitutes the product values as replacement values for the invalid samples.

The apparatus of the invention is further characterized in that it operates in accordance with the flow charts of FIGS. 4 and 5.

BRIEF DESCRIPTION OF THE DRAWINGS

The invention and how it can be put into effect will now be further described by way of example with reference to the accompanying drawing, wherein.

DESCRIPTION OF THE PREFERRED EMBODIMENT

The invention can advantageously be used for a sampled speech signal of which a number of samples is mutilated such as by interferences so that at the receiver side of an associated transmission system the samples are considered as invalid. Such a situation can, for example occur in a telephony system of the type known as MAT (mobile automatic telephony). Due to what is commonly referred to as selective fading, the signal received and consequently the speech signal received fails regularly and for a short period of time. It has been found that a speech signal modulated on a carrier of, for example, approximately 300 MHz is received undisturbed and disturbed at the receiver at given intervals which depend on the speed at which a relevant vehicle functioning as a mobile station of such a telephony system travels.

The restoration technique performed by the invention makes it possible to reliably restore invalid samples of a speech signal sampled at a frequency of 8000 Hz, if the interval containing unknown samples is less than approximately 12 msec, and if the relevant speech signal is available undisturbed on both sides of such an interval, for approximately 3 msec.

Figure 1:
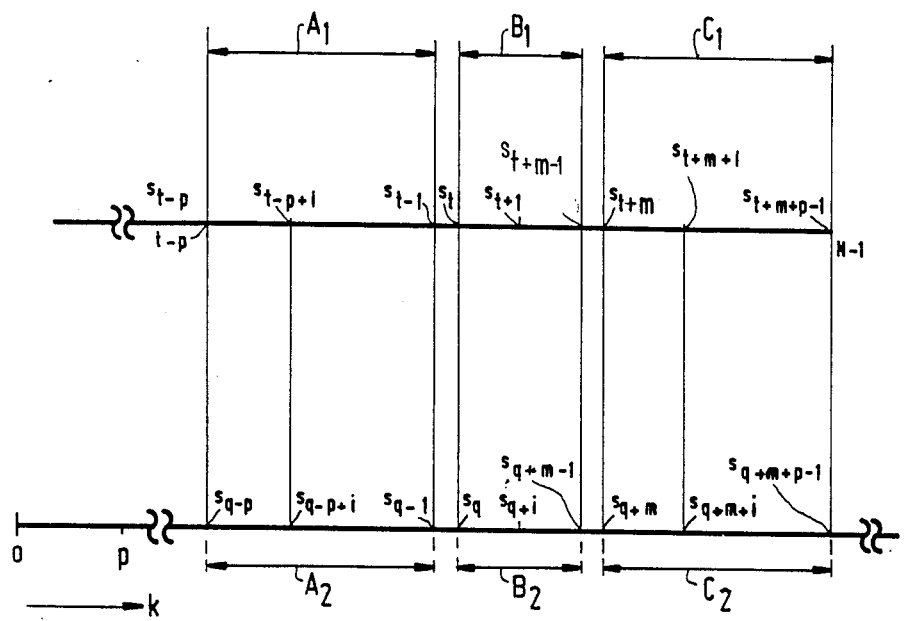
FIG. 1 shows a time diagram with reference to which the principle of the present invention will be described.

Hereinafter, the principle of the present invention will be further described with reference to FIG. 1. The diagram shown in FIG. 1 is illustrative of a sequence of consecutive samples $s_k$, wherein $k = 0, \ldots, N-1$. Of such samples, the m samples $s_t, \ldots, s_{t+m-1}$, in interval $B_1$ form a sequence of samples which are considered invalid and must be restored. In other words, the replacement estimated values $t+i$, wherein $i=0, \ldots, m-1$ must be found for these invalid samples. These replacement values must approach the original values of these invalid samples to the best possible extent, or in any case be such that in the ultimately restored signal substantially no observable errors occur.

The invention is based on the principle that such replacement values can be derived from the values of that sequence of valid samples $s_{q+i}$ whose environment approximates the environment of the sequence $s_{t+i}$ to the best possible extent, FIG. 1 interval $B_2$. In the foregoing, q represents a sample position in a chosen further range of samples, while for i it holds that $i=0, \ldots, m-1$. As is shown in FIG. 1, the sequence $s_{t+i}$ of invalid samples is bounded between a pre-environment $A_1$ defined by the samples $s_{t-p}$ and $s_{t-1}$, and a post-environment $C_1$ following the sequence of invalid samples. The sample position index q will now be chosen within the limitations of $$p \leq q \leq t-p; \text{ and } 2_{p+m} < t. \quad (1)$$

It is now possible to define for each sequence $s_{q+i}$, wherein $i=0, \ldots, m-1$, defined by a sample index position q, also a pre-environment interval $A_2$ and a post-environment interval $C_2$, each comprising a number of p samples. The respective pre-environment and post-environments can now be defined by $s_{q-p}$ and $s_{q-1}$ and $s_{q+m}$ and $s_{q+m+p-1}$, respectively.

The strategy for determining the sequence of valid samples which will ultimately be suitable to serve as a source for making available the replacement values of the samples which are considered invalid is as follows. For each of a plurality of sets having different q-values, the pre-environment and the post-environment of a sequence $s_{q+i}$, wherein $i=0, \ldots, m$ defined by the chosen q-value, is compared with the pre-environment and the post-environment of the sequence $s_{t+i}$ of invalid samples. That environment which, but for a scaling factor $a_q$, most closely approximates the environment of the sequence of invalid samples $s_{t+i}$ then identifies the boundaries of the sequence $s_{q+i}$ looked for. This means in practice that the sampling values $$t+i = a_q s_{q+i}, \quad (2)$$

wherein $i=0, \ldots, p-1$,
are the desired estimation values which can be used in the position of the invalid samples if the pre-environment and post-environment, respectively, of these invalid samples is approached to the closest possible extent by the pre-environment and post-environment of samples which can be represented by $$a_q s_{q-p+i},$$

wherein $i=0, \ldots, p-1$,
and $$a_q s_{q+m+i},$$

wherein $i=0, \ldots, p-1$.

The scaling factor $a_q$ depends on the value chosen for the sample position index q for a relevant equation. By introducing such a scaling factor $a_q$ it can be accomplished that environments of the same shapes which are compared with each other can also be made equal to each other as regards their magnitude.

The above-described strategy is based on the assumption that one set of samples is "similar" to another set of samples, if the environments of these two sets of samples may be considered as "similar". For the case of voiced speech, in other words in the case of a signal considered as periodical, this assumption is certainly correct. Because of this periodical character of voiced speech it is, in addition, substantially certain that in a finite interval preceding the sequence of samples to be restored, a sequence of valid samples is present whose values, after scaling, can serve as replacements for the samples considered as invalid. For the case of unvoiced speech, which has rather the character of noise, this is not always the case. Despite that, it has been found that the proposed restoration technique leads to satisfactory results even when the received signal is unvoiced speech.

From the foregoing it will be obvious that identifying the sequence of valid samples $s_{q+i}$ wherein $i=0, \ldots, m-1$, which is suitable for supplying replacement values, in practice means finding the correct values for the quantities p and q and $a_q$. As is also illustrated in FIG. 1, the samples suitable for use as the replacement values are looked for in a finite interval preceding the sequence of samples $s_{t+i}$, wherein $i=0, \ldots, m-1$ to be restored. As will also be obvious from FIG. 1, the sequence $s_k$, wherein $k=0, \ldots, t+m+p-1$, wherein $k \neq t, \ldots, t+m-1$, is available for that purpose.

Taking account of the limitations imposed by formula (1), it holds that $t-p-m-p=t-2.p-m$ defines a stock of valid samples which are suitable for making replacement values available for the invalid samples. As will further be clear from formula (1), p must in any case be less than $(t-m)/2$. It was found experimentally that $p \geq 25$ provides satisfactory results. With a customary sampling rate of 8000 Hz of a speech signal, this implies that the subsequent sequence produces a delay of only 3.125 msec.

For each chosen value of the sample position index q wherein $q=p, \ldots, t-p$ a value of $a=a_q$ can be determined, as a result of which the expression $$\epsilon(q,a) = \sum_{i=o}^{p-1} [(s_{t-p+i} - as_{q-p+i})^2 + (s_{t+m+i} - as_{q+m+i})^2] \quad (3)$$

minimizes. Thus, each environment, more specifically the pre-environment and post-environment, respectively, as described by $$[(s_{q-p+i})_{i=0, \ldots, p-1}, (s_{q+m+i})_{i=0, \ldots, p-1}]_{q=p, \ldots, t-p} \quad (4)$$

can be scaled such that the means square error as described by formula (3) relative to the environment, more specifically the pre-environment and post-environment, respectively, as defined by $$[(s_{t-p+i})_{i=0, \ldots, p-1}, (s_{t+m+i})_{i=0, \ldots, p-1}] \quad (5)$$

is minimal. The scaling factor $a_q$ suitable for use as a selected sample position index q is that value for a for which the first derivative of the expression defined by (3) becomes equal to zero. From the equation thus obtained $a_q$ can be solved in accordance with $$a_q = \quad (6)$$

$$\frac{\sum_{i=o}^{p-1} (s_{t-p+i} \cdot s_{q-p+i} \cdot s_{t+m+i} \cdot s_{q+m+i})}{\sum_{i=o}^{p-1} (s_{q-p+i}^2 + s_{q+m+i}^2)}, q=p, \ldots t-p$$

The expression $\epsilon(q, a_q)$ can be written as $$\epsilon(q,a_q) = \quad (7)$$

$$\sum_{i=o}^{p-1} (s_{t-p+i}^2 + s_{t+m+i}^2) - a_q^2 \sum_{i=o}^{p-1} (s_{q-p+i}^2 + s_{q+m+i}^2)$$

The correlation procedure proposed by this equation (7) is schematically illustrated in FIG. 1 in that the environments (test invironments) in this Figure, defined by a given sample position index q are shown below the environment bounding the sequence of samples to be restored and with which the said first environments are compared.

The optimum value for the sample position index q, $q=q_{opt}$ and the optimum value for the scaling factor $a_q$, $a_q = a_{opt}$ is now that value of q and $a_q$ for which the result of the equation (correlation) represented by equation (7) is minimal.

A method which is illustrative of the invention comprises the following steps:

For all the available values for the sample position index q, wherein $q=p, \ldots, t-p$, the value $a_q$ as defined in equation (6) and the correlation result in accordance with equation (7) are each time determined. From all the pairs $$[a_q, \epsilon(q, a_q)]_{q=p, \ldots, t-p}$$

thus determined that pair is determined for which $\epsilon(q, a_q)$ is minimal. The associated values for q and $a_q$ are the values $q_{opt}$ and $a_{opt}$. Thereafter, on the basis of the $q_{opt}$ and $a_{opt}$ thus determined, replacement values can be determined in accordance with $$t+i = a_{opt} \cdot s_{q_{opt}+i}, i=0, \ldots, m-1 \quad (8)$$

It has been ascertained that $a_{opt}$ must be positive. This implies that the pairs $[a_q, \epsilon(q, a_q)]$, wherein $a_q < 0$ must be left out of consideration when looking for the minimum for $\epsilon(q, a_q)$.

Figure 2:
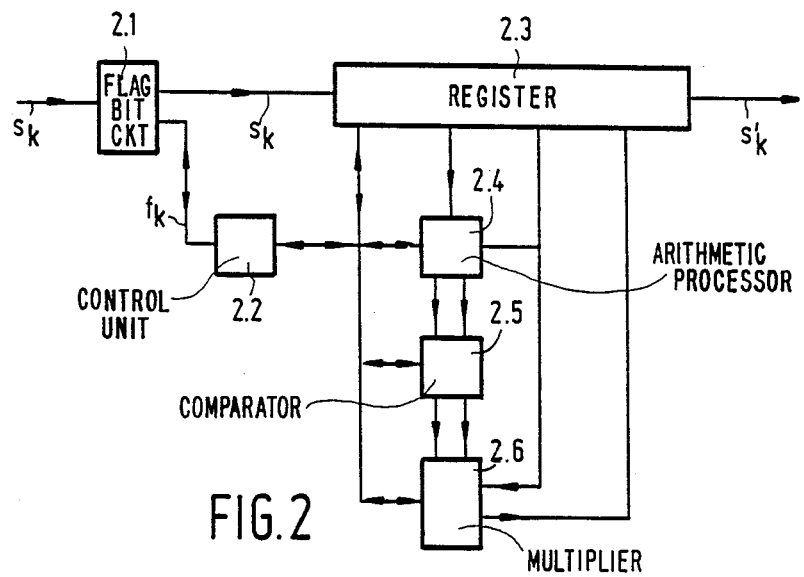
FIG. 2 is a functional block circuit diagram to illustrate the basic operations performed in accordance with the present invention.

FIG. 2 shows a general circuit diagram of a configuration of components dissolved in performing basic functions of the method according to the invention.

An equidistantly sampled signal, for example a speech signal is supplied in the form of a sequence of digital samples $s_k$. A flag bit which indicates whether a replacement sample must be considered as valid or invalid is included in each of the applied samples. The samples are applied to a flat bit-recognizing circuit 2.1 which at an output generates a flag bit signal $f_k$ which informs a control arrangement 2.2 of the fact whether an applied sample is be qualified as being valid or invalid. Via a different output of flag bit-recognizing circuit 2.1 the incoming signal samples $s_k$ are applied to a randomly accessible register 2.3. This register has such a storage capacity that all the incoming samples required to complete a restoration cycle relating to a sequence of samples qualified as invalid, are available. The control arrangement 2.2 is inter alia arranged for determining in accordance with a predetermined program routine, on the basis of the flag bit signals and the samples present in the register 2.3, whether a restoration procedure for restoring a number of samples which are considered invalid must be initiated and completed or not. As soon as this control arrangement has ascertained that of a sequence of samples stored in the register 2.3 a set must be restored, all the samples in the positions q, wherein $q = p, \ldots, t-p$, are read from the register 2.3, all this in such a manner as defined with reference to FIG. 1, the values of such samples being inputted to an arithmetic processor unit 2.4. Fundamentally, such an arithmetic unit performs a calculation whereby an environment of a relevant sequence of stored samples can be compared to an environment of an equally large sequence of valid samples which appear in a chosen period of time earlier, such a comparison being made for a plurality of different chosen periods of time. More specifically, the arithmetic unit 2.4 is arranged to always calculate for a selected value q the quantities a and $\epsilon(q, a_q)$ in accordance with the formulas (6) and (7) above, from the sample values read from the register 2.3. The results of the operation performed by the arithmetic unit 2.4, more specifically the pairs $a_q$ and $\epsilon(q, a_q)$ generated for the chosen q-values, are applied to a comparator unit 2.5. Fundamentally, this comparator unit performs the function whereby the environment which most closely approximates the environment of the sequence of samples to be restored is selected. More specifically, this comparator unit 2.5 is arranged for finding from the results supplied by the arithmetic means 2.4, that combination for which the relevant quantity $\epsilon(q, a_q)$, wherein $a_q < 0$, is minimal. The values associated therewith for q and $a_q$, namely $q_{opt}$ and $a_{opt}$, are supplied by comparator unit 2.5 to a multiplier 2.6. This multiplier is also arranged to read, under the control of the control arrangement 2.2, the stored samples in the positions $q_{opt}, \ldots q_{opt+m-1}$ determined by the quantity $q_{opt}$ supplied, and to receive such sample values. Multiplier 2.6 is then operative for multiplying each of the sample values thus received by the quantity $a_{opt}$ supplied by the comparator unit 2.5, and to supply the ultimate replacement values to register 2.3 for the sample positions $t, \ldots, t+m-1$. Thus, this multiplier performs basically the function whereby the valid samples which are bounded by the environment chosen by the comparator unit, are used to form the replacement values of the samples to be restored.

After such a restoration cycle the restored sequence of samples is supplied from the output of the register 2.3, also under the control of the control unit 2.2.

Generally the invention is suitable for use in those situations in which digitized signals, such as audio signals and more particularly speech signals, can be received in a disturbed state. The positions of the disturbed samples must be known, as also the position of the samples which determine the prior and post-environments. The invention is also suitable for restoring disturbed analog speech signals, after the signals have been converted to digital form.

The invention is also suitable for use in restoring speech signals which during transmission were protected by an error-correcting and detection code. In that case those samples can be restored which were detected as an error, but could not be corrected anymore by such code.

Figure 3:
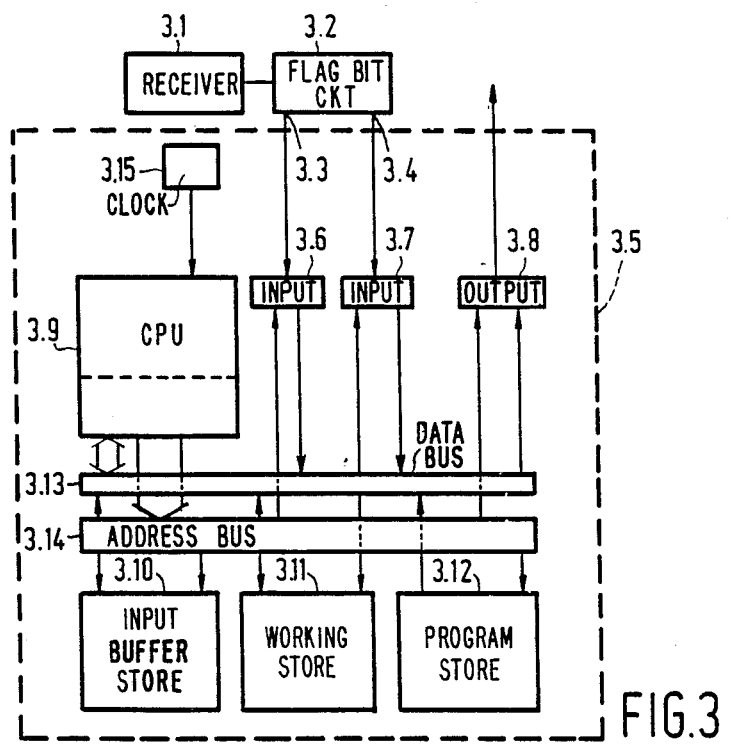
FIG. 3 is a block circuit diagram of an apparatus according to the invention.
Figure 4:
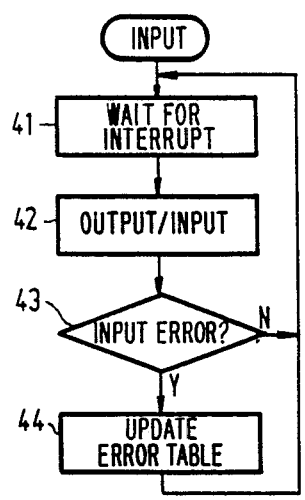
FIG. 4 is a flow chart to illustrate an input/output program performed according to the invention.

FIG. 3 shows a block circuit diagram of an embodiment of an arrangement according to the invention. The block 3.1 is a receiver which at its output can develop from a received signal a sequence of samples $s_k$ such as they were described with reference to FIG. 2. The block 3.2 corresponds to the flag bit-recognizing circuit shown in FIG. 2. The values of the incoming samples appear at the output 3.3 in the form of 16-bit words. When at the output 3.3 a sample appears of a value which is regarded as invalid, a flag bit signal formed by a 1-bit word and indicating that the relevant sample is invalid appears at the output 3.4. The values of the samples and the flag bit signals are applied to the respective input arrangement 3.6 and 3.7 of a microprocessor configuration 3.5 arranged for implementing a restoration cycle for samples to be restored. In addition to an output 3.8 at which the sample values are outputted, this processor 3.5 comprises a central processing unit 3.9 of which a control member, an arithmetic member and a logic unit form part. Furthermore, the processor 3.5 includes three memories 3.10, 3.11 and 3.12. The memories 3.10 and 3.11 are random access memories, the memory 3.10 acting as a cyclic buffer and the memory 3.11 acting as a working store for storing the intermediate results. The memory 3.12 is a static memory in which the programs for restoring invalid samples are stored. The memories 3.10, 3.11 and 3.12 are coupled to the central processing unit 3.9 via a data bus 3.13, via which bus data can be inputted and outputted. For conveying addresses, the memories 3.10, 3.11 and 3.12 and also the inputting and outputting arrangements 3.6, 3.7 and 3.8 are coupled to the central processing unit 3.9 via an address bus 3.14. Furthermore, the processor 3.5 includes a clock 3.15 under whose control the operation of the central processing unit can be interrupted in order to permit the inputting and outputting of data to take place. Namely, digital audio signals require a constant through-put in order to accomplish that the frequency with which the samples appear at the output is the same as the rate at which the relevant signal is sampled. Inputting and outputting of data is controlled via a program stored in the program store 3.12. FIG. 4 illustrates a flow-chart of this program.

This program can be described as follows: (for captions see Table 1).

Block 4.1, caption: "wait for interrupt"; description: data can be inputted and outputted during an interrupt which is initiated when a clock pulse from data clock 3.5 appears.

Block 4.2: caption: "output/input"; description: upon the appearance of a clock pulse the value of a new sample is inputted via the input 3.6 and entered into the first free address in the memory 3.10, and the oldest sample present in memory 3.4 is read and outputted.

Block 4.3, caption: "input error?"; description: upon entering a new sample, the flag bit signal is at the same time entered via input 3.7. When no invalid sample is detected, the subsequent clock pulse is waited for repeating the procedure.

Block 4.4, caption: "update error table"; description: if a sample is detected as being invalid, the address of this sample is entered from the memory 3.10, into a Table of invalid samples in the working memory 3.11.

Under the regime of the above-described program, the cyclic buffer store 3.10 operates as a delay line, whose delay is determined by the period of time necessary for a restoration cycle measured from the arrival of the first sample, which is qualified as invalid, increased by the period of time of the required post-environment. The program stored in the memory 3.12, with which the replacement values for the samples to be corrected are calculated, is started when the input/output program detects a sample as being invalid.

This restoration program will now be described in greater detail with reference to FIG. 5, which shows a flow chart with this program. (For captions see Table II).

Block 51: "wait for an error pattern to be restored", description: as long as no pattern of invalid samples is detected the restoration program is inoperative.

Block 52: caption "compute $q_{opt}$ and $a_{opt}$"; from a row of possible values of $q=p, \ldots, t-p$, a value of $a=a_q$ is determined for which the expression $$\epsilon(q,a) = \sum_{i=o}^{P-1} [(s_{t-p+i} - as_{q-p+i})^2 + (s_{t+m+i} - as_{q+m+i})^2]$$

is minimised. The scaling factor $a_q$ which is suitable for use for a selected sample position index q is that value of a for which the first derivative of the expression defined by (3) becomes equal to zero. From the equation of $a_q$ obtained therefrom there are dissolved in accordance with $$a_q = \frac{\sum_{i=0}^{P-1}(s_{t-p+i} \cdot s_{q-p+i} + s_{t+m+i} \cdot s_{q+m+i})}{\sum_{i=0}^{P-1}(s_{q-p+i}^2 + s_{q+m+i}^2)}, q = p, \ldots t-p$$

The expression $\epsilon(q, a_q)$ can be written as $$\epsilon(q,a_q) = \sum_{i=o}^{P-1}(s_{t-p+i}^2 + s_{t+m+i}^2) - a_q^2 \sum_{i=o}^{P-1}(s_{q-p+i}^2 + s_{q+m+i}^2)$$

The correlation procedure proposed by this equation (7) is schematically illustrated in FIG. 1, in that the environment defined by a given sample position index q (test environments) are shown in this Figure below the environments bounding the sequence of samples to be restored and with which the test environments are compared.

The optimum value for the sample position index q, $q=q_{opt}$, and the optimum value for the scaling factor $a_q$, $a_q=a_{opt}$, is now that value of q and $a_q$ for which the result of the equation (correlation) represented by equation (7) is minimal. If it is found that $a_{opt}$ must be positive, that means that the pairs $[a_q, \epsilon(q, a_q)]$ wherein $a_q<0$ must be ignored in the search for the minimum for $\epsilon(q, a_q)$.

Block 53: caption "compute replacement samples $_{t+i}$, then the sample $_{t+i}$ is determined in accordance with $_{t+i}=a_{opt} \cdot q_{opt+i}$, $i=0, \ldots, m-1$".

Block 54: caption "restore buffer samples, here the values of the invalid samples are replaced by the estimated values $_{t+i}$, $i=0, \ldots, m-1$. Thereafter the program is again cycled through.

Tables

TABLE 1

| Caption flow chart FIG. 4. | |
|---|---|
| block number | caption |
| 41 | "wait for interrupt" |
| 42 | "output/input" |
| 43 | "input error?" |
| 44 | "update error table" |

TABLE 2

Figure 5:
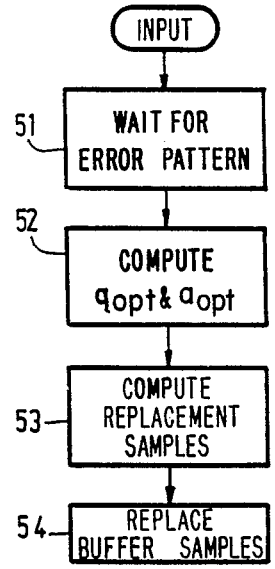
FIG. 5 is a flowchart for further illustration of the restoration technique according to the invention.

| captions flow chart FIG. 5. | |
|---|---|
| block number | caption |
| 51 | "wait for an error pattern that can be restored" |
| 52 | "compute $q_{opt}$ and $a_{opt}$" |
| 53 | "compute replacement samples s + m" |
| 54 | "update buffer" |

TABLE 3

$$p \leq q \leq t - p, 2R + m < t \quad (1)$$

$$s_{t+i} = a_q s_{q+i}, i = 0, \ldots, m - 1 \quad (2)$$

$$\epsilon(q,a) = \sum_{i=0}^{P-1} [(s_{t-p+i} - a \cdot s_{q-p+i})^2 + (s_{t+m+i} - a \cdot s_{q+m+i})^2] \quad (3)$$

$$[(s_{q-p+i})i=0, \ldots, p-1, (s_{q+m+i})i=0, \ldots, p-1]q=p, \ldots, t-p \quad (4)$$

$$[(s_{t-p+i})i=0, \ldots, p-1, (s_{t+m+i})i=0, \ldots, p-1] \quad (5)$$

$$a_q = \frac{\sum_{i=0}^{P-1}(s_{t-p+i} \cdot s_{q-p+i} + s_{t+m+i} \cdot s_{q+m+i})}{\sum_{i=0}^{P-1}(s_{q-p+1}^2 + s_{q+m+i}^2)}, \quad (6)$$

$$q = p, \ldots t - p$$

$$\epsilon_{q,a_q} = \sum_{i=0}^{P-1}(s_{t-p+i}^2 + s_{t+m+i}^2) - d^2 \sum_{i=0}^{P-1}(s_{q-p+i}^2 + s_{q+m+i}^2) \quad (7)$$

$$s_{t+1} = a_{opt} \cdot s_{qopt} + i, i = 0, \ldots, m - 1 \quad (8)$$

What is claimed is:

1. A method of replacing a sequence $s_{t+i}$ of m invalid samples of an equidistantly sampled signal, wherein $i=0, 1, \ldots, m-1$, and t is the ordinal time position of the first sample $s_t$ in said sequence, with m corrected samples derived from an optimum sequence of valid samples of such signal, said optimum sequence being selected from a plurality of sequences $s_{q+i}$ of valid samples of such signal, wherein q is the ordinal time position of the first sample $s_q$ in each of said sequences, each sequence of valid samples being of the same length as said sequence of invalid samples; said method comprising:

correlating signal samples in an environment of said sequence of invalid samples with signal samples in environments of each of said sequences of valid samples, said sequences of valid samples occurring at respectively different periods of time prior to said sequence of invalid samples;

selecting as said optimum sequence the one of said plurality of sequences of valid samples having an environment which most closely correlates with the environment of said sequence of invalid samples; and replacing said sequence of invalid samples with said optimum sequence of valid samples.

2. A method as claimed in claim 1, wherein the environment of said sequence of invalid samples $s_{t+i}$ comprises a number of valid samples immediately preceding the first invalid sample $s_t$ and a number p of valid samples immediately succeeding the last invalid sample $s_{t+m-1}$; and the environment of each of said sequences $s_{q+i}$ of valid samples to be correlated with said sequence $s_{t+i}$ of invalid samples comprises a number p of samples immediately preceding the sample $s_q$ and a number of samples immediately succeeding the sample $s_{q+m-1}$, q being in the range $p \leq q \leq t-p$; said method further comprising:

determining the correlation values of said environment of said sequence $s_{t+i}$ of invalid samples with said environments of the respective sequences $s_{q+i}$ of valid samples, and storing such correlation values;

determining the minimum stored correlation values and a time position $q_{opt}$ of a sequence $sq_{opt+i}$ of valid samples having such minimum correlation values, said sequence $sq_{opt+i}$ being said optimum sequence; and replacing said sequence $s_{t+i}$ of invalid samples with said optimum sequence $sq_{opt+i}$ of valid samples, said optimum sequence being $sq_{opt}, sq_{opt+i}, \ldots, sq_{opt+m-1}$.

3. A method as claimed in claim 2 wherein, prior to determining said correlation values, the samples in said environment of each sequence $s_{q+i}$ of valid samples are multiplied by a scaling factor $a_q$ which minimizes the mean square error of the samples in such environment relative to the samples in the environment of said sequence $s_{t+i}$ of invalid samples, the value of $a_q$ being $a_{qopt}$ for said optimum sequence $sq_{opt+i}$; and multiplying the samples in said optimum sequence by $a_{qopt}$ prior to replacing said sequence $s_{t+i}$ of invalid samples with said optimum sequence $sq_{opt+i}$ of valid samples.

4. Apparatus for replacing a sequence $s_{t+i}$ of m invalid samples of an equidistantly sampled signal, wherein $i = 0, 1, \ldots m-1$, and t is the ordinal time position of the first sample $s_t$ in said sequence, with m corrected samples derived from an optimum test sequence of valid samples of such signal, said optimum test sequence being one of a plurality of test sequences $s_{q+i}$ of valid samples of such signal, wherein q is the ordinal time position of the first sample $s_q$ in each of said test sequences, said test sequences being of the same length as said sequence of invalid samples, the value of q for said optimum test sequence being $q_{opt}$; said apparatus comprising:

storage means for storing therein said sequence of invalid samples, said test sequences, samples in an environment of said sequence of invalid samples, and samples in environments of the respective test sequences;

arithmetic processing means coupled to said storage means for deriving correlation values of stored valid samples in said environment of said sequences $s_{t+i}$ of invalid samples and stored valid samples in said environments of the respective test sequences, the respective test sequences occurring at respectively different periods of time prior to said sequence $S_{t+i}$ of invalid samples;

comparator means coupled to said arithmetic processing means for determining the minimum correlation values derived by said arithmetic processing means, and producing control signals identifying the test sequence having such minimum correlation values, such test sequence being said optimum test sequence $sq_{opt+i}$; and selection means controlled by the control signals from said comparator means to select said optimum test sequence from the test sequences stored in said storage means, and which replaces said sequence of invalid samples with said optimum test sequence.

5. Apparatus as claimed in claim 4, wherein:

the environment of said sequence $s_{t+i}$ of invalid samples includes a number p of valid samples immediately preceding the sample $s_t$, and the environment of each of said test sequences $s_{q+i}$ comprises a number p of samples immediately preceding the sample $s_q$, q being in the range $p \leq q < t-p$;

said arithmetic processing means calculates for each of a number of values of q the quantities $a_q$ and $\epsilon(q, a_q)$ in accordance with the formulae $$a_q = \frac{\sum\limits_{i=0}^{p-1}(s_{t-p+i} \cdot s_{q-p+i} + s_{t+m+i} \cdot s_{q+m+i})}{\sum\limits_{i=0}^{p-1}(s_{q-p+i}^2 + s_{q+m+i}^2)}, q = p, \ldots t-p$$

and $$\epsilon(q,a_q) = \sum_{i=0}^{p-1}(s_{t-p+i}^2 + s_{t+m+i}^2) - a_q^2 \sum_{i=0}^{p-1}(s_{q-p+i}^2 + s_{q+m+i}^2);$$

said comparator means identifies the pair of quantities $a_q$ and $\epsilon(q, a_q)$ calculated by said arithmetic processing means for which $\epsilon(q, a_q)$ has the lowest value, and produces control signals representing the values of q and $a_q$ ($a_q > 0$) associated therewith, such values being $q_{opt}$ and $a_{qopt}$; and said selection means multiplies the samples in said sequence $sq_{opt+i}$ by $aq_{opt}$, and supplies such multiplied samples to said storage means to replace the subsequence $s_{t+i}$ of invalid samples stored therein.

* * * * *